July 12, 1938.  C. CARRINGTON  2,123,452
INTERNAL COMBUSTION ENGINE
Filed May 20, 1932
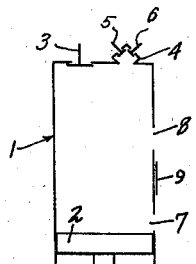
Fig. 1
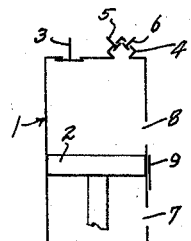
Fig. 2.
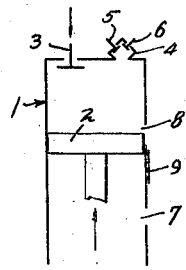
Fig. 3.
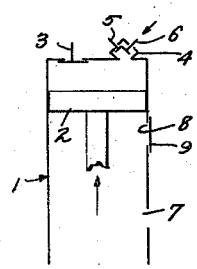
Fig. 4.
Fig. 5.
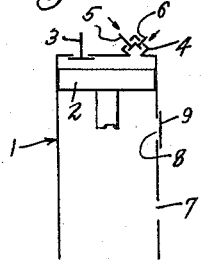
Fig. 6.
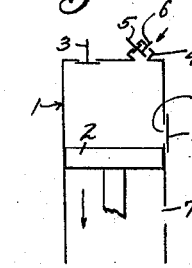
Fig. 7.
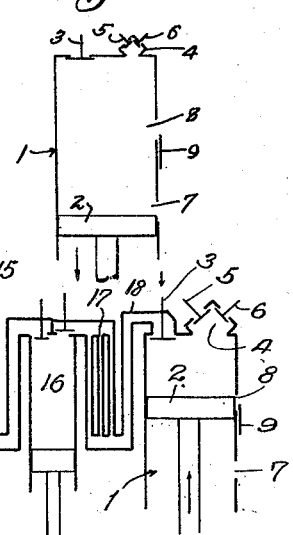
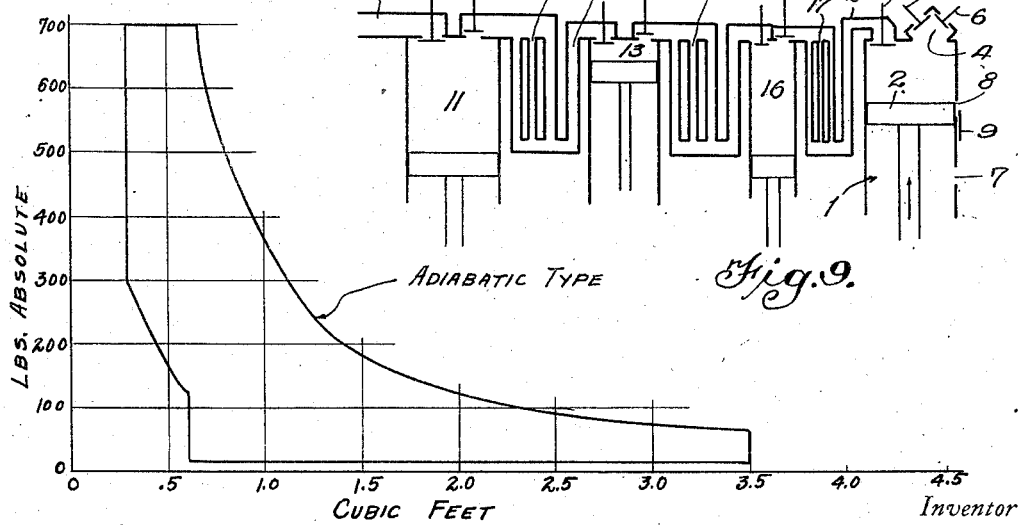
Fig. 8.
Fig. 9.
Inventor
Cabell Carrington
By Lyon & Lyon
Attorneys Patented July 12, 1938

2,123,452

UNITED STATES PATENT OFFICE 2,123,452

INTERNAL COMBUSTION ENGINE

Cabell Carrington, South Pasadena, Calif., assignor to Ellen P. Carrington, Pasadena, Calif.

Application May 20, 1932, Serial No. 612,495

2 Claims. (Cl. 123—32)

This invention relates to an improved method of operating internal combustion engines whereby the disadvantages and limitations of engines operating in accordance with the Otto cycle or the Diesel or Semi-Diesel cycles are obviated. The invention also relates to a form of engine in which the method of this invention may be utilized to great advantage.

This invention primarily relates to an improved method of operating two cycle internal combustion engines wherein air at a superatmospheric pressure (preferably compressed outside of the working cylinder of the engine along lines as nearly isothermal as possible) is injected into the working cylinder of the engine and compressed therein substantially along adiabatic lines. Fuel is then injected into a mixing zone which is in communication with the working cylinder and heated air or gas then injected into such mixing zone whereby initiation of ignition of the fuel occurs in the mixing zone. The ignited fuel is discharged into the compressed air in the working cylinder wherein explosion, combustion and expansion take place. The injection of fuel in the form of mist or spray may be continued into the mixing zone during a portion, at least, of the expansion stroke, this fuel finding its way into the working cylinder. The combustion and expansion may be of the constant volume or constant pressure type or along a line varying from constant volume combustion into constant pressure combustion, followed by adiabatic expansion or expansion along approximately constant temperature lines (when an especially cool working engine is desired). Exhaust takes place at the completion of the expansion and during the first portion of the compression stroke.

This new cycle of operations can be readily distinguished from the Otto, Diesel or Semi-Diesel cycles. The Otto cycle is strictly limited in its compression before ignition in conformity to a temperature lower than the ignition temperature of the fuel employed. As a result, explosion or ignition takes place at relatively low pressures. The Otto cycle is, furthermore, limited to the lighter and more volatile fuels such as gasoline, alcohol and gas. The cycle of operations embraced by this invention, however, is not so limited. Furthermore, in many of the Otto, Diesel and Semi-Diesel cycles, the maximum pressure developed may only be raised by a corresponding rise in maximum temperature whereas in the cycle of this invention, the maximum pressure may be raised independently of a rise in maximum temperature, thereby permitting the use of higher maximum pressures and cooler working engines.

Although most of the Otto, Diesel and Semi-Diesel cycles attain their efficiency through the use of a high maximum temperature, the cycle of this invention, while perfectly capable of employing a high maximum temperature, may advantageously employ a much lower maximum temperature. In the method of operation described herein, a maximum temperature only high enough to insure efficient combustion of the fuel employed may be utilized.

The cycle of this invention is practically unlimited in the degree of compression before ignition. For example, the cycle of this invention may employ an effective compression ratio either greater, equal to, or less than the expansion ratio. Preferably, however, the effective expansion ratio in the working cylinder of the engine is greater than the effective compression ratio, that is, the stroke of the piston in the working cylinder during compression is shorter than the distance travelled by the piston during expansion.

It is an object of this invention, therefore, to disclose and provide a method of operating internal combustion engines wherein the maximum temperature both before and after ignition may be readily controlled.

Another object is to disclose and provide a cycle of operations in which pressures may be controlled with respect to volume and in which the process of combustion is under almost complete control.

A further object of the invention is to disclose and provide an operating cycle for internal combustion engines in which the compression before ignition is not limited by the temperature of ignition of the fuel employed.

These and other objects, uses and advantages of this invention will become apparent to those skilled in the art from the following detailed description of the invention.

In order to facilitate understanding of the invention, reference will be had to the appended drawing, in which:

Figs. 1 to 7 diagrammatically represent various steps in the cycle of operations coming within the scope of this invention.

Fig. 8 is a theoretical diagram illustrating the operation of a two cycle engine in accordance with one mode of operation coming within the scope of this invention.

Fig. 9 diagrammatically illustrates a more complete arrangement of elements whereby the invention may be carried out.

The cycle of operations may perhaps be best understood by referring to Figs. 1 to 7 wherein 1 represents a working cylinder of an internal combustion two cycle engine, said cylinder being provided with a piston 2 suitably connected by means of a connecting rod, etc., to a crank shaft. The head end of the cylinder is provided with a suitable valved air inlet such as the inlet controlled by the valve 3. A mixing chamber 4 is also in communication with the head end of the cylinder 1 through a relatively small aperture. Means are provided for introducing heated air or gas and fuel into the mixing chamber 4. The valve 5 diagrammatically represents means for regulatably introducing a heated gas. The valve 6 diagrammatically represents a means for injecting solid or liquid fuel in the form of a spray or mist. The cylinder 1 is also provided with two sets of exhaust ports. An exhaust port located near the bottom of the cylinder and adapted to be uncovered by the piston 2 only at near the completion of the expansion stroke, is indicated at 7. A second exhaust port 8 is formed in the walls of the cylinder 1 at a point between the port 7 and the head end of the cylinder. The precise location of this port 8 will depend upon working conditions such as the degree of pressure at which compressed air is available, precise manner in which it is desired to operate the engine, the type of fuel employed, the maximum pressure to be developed, etc. Normally, however, the port 8 may be substantially midway between the port 7 and the head end of the cylinder.

Means are also provided for closing the exhaust port 8, such as the valve means 9. It is to be understood that the various valve means, such as the valves 3, 5, 6 and 9, are operatively connected to driving or actuating means whereby the various valves are opened and closed in desired time relation to each other and to the movement of the piston 2. Such driving or actuating means are not shown as those skilled in the art can readily design and construct suitable mechanisms for performing these operations.

Fig. 1 represents the piston 2 at the bottom of its stroke in the cylinder 1. It is to be observed that the two exhaust ports 7 and 8 are uncovered whereas the valves 3, 5, and 6 are seated, thereby preventing the injection of air at a superatmospheric pressure, heated air or fuel. As the piston rises, as shown in Fig. 2, the exhaust port 8 is still open. During the first portion of the compression stroke or upward travel of the piston 2, therefore, gases present in the working cylinder 1 are discharged through the exhaust ports 7 and 8. As the piston 2 approaches exhaust port 8, however, the valve 3 may open, permitting air under superatmospheric pressure (and preferably at atmospheric temperature, although air at any temperature may be used) to be injected into the head end of the cylinder 1. Such injection of air at superatmospheric pressure scavenges the cylinder, driving residual gases out through the exhaust port 8. As the piston 2 covers the exhaust port 8, the injection of air by valve 3 is continued and the true compression stroke comes into effect. The injection of superatmospheric air into the head of the cylinder 1 is continued during the upward travel of the piston 2 until the pressure within the cylinder counterbalances the pressure of the incoming air, whereupon the valve 3 will close, as shown in Fig. 4. The upward travel of the piston 2 continues, however, further compressing the trapped air in the cylinder 1, fuel being now injected by valve 6 into the mixing chamber 4 and head of the cylinder 1. In other words, the injection of the fuel takes place during the compression of the air in the compression zone of the engine.

At a proper time with respect to maximum compression obtained within the cylinder 1, and preferably while the injection of fuel by valve 6 is continued, a charge of heated gas is injected at a superatmospheric pressure into the mixing zone 4 by valve 5. The mixing zone as well as the head end of the cylinder 1 is filled with a compressed mixture of air and fuel. The injection of heated air by valve 5 into the pre-mixing zone 4 causes ignition of the fuel in the mixing zone. The fuel ignited in the mixing zone 4 then causes ignition, explosion and combustion of the mixture of gases or fuel and air in the head of the cylinder 1, the expansion and high pressure thus developed being transmitted to the piston 2 during its downward travel.

Fig. 5 represents the simultaneous injection of fuel and hot air at about the time of maximum compression of the charge within the working cylinder 1. It is to be understood that such simultaneous introduction of fuel and hot air for the purpose of igniting the fuel in the mixing zone 4 need not necessarily take place when the piston 2 is at precisely the upper limit of its travel. As a matter of fact, such admission of hot air may take place at any time from about 30 degrees prior to dead center to 15 degrees beyond dead center, the precise time of hot air injection being entirely dependent upon pressure conditions, type of fuel employed, type of expansion desired, and other considerations. Furthermore, it is to be understood that the injection of heated air for the purpose of initiating combustion is discontinued as soon as such ignition has started.

During the final period of compression in the upper end of the cylinder 1, the valve 9 is moved into place so as to cover the exhaust port 8. During the expansion stroke, therefore, the piston 2 may pass the port 8, which is now sealed by the valve 9 and the expansion may continue therebeyond. During such expansion stroke, additional quantities of fuel may be injected by the valve 6 as shown in Fig. 6 for the purpose of maintaining substantially constant pressure or constant pressure followed by constant temperature combustion after the initial constant volume portion of the cycle.

Toward the latter portion of the expansion stroke the injection of fuel by valve 6 may be discontinued and when the piston 2 begins to uncover the exhaust port 7, the valve 9 may also uncover the exhaust port 8, thereby permitting the burnt gases to be simultaneously discharged through ports 7 and 8. Thereafter the operation reverts to that shown in Figs. 1, 2, etc.

In the above embodiment of this invention, it will be noticed that actual compression only takes place during a portion of the upward travel of the piston 2 whereas the expansion stroke was of appreciably greater length. In this manner, full benefit may be derived from the expansion characteristics of the gases. The previously substantially isothermally compressed air introduced by valve 3 not only facilitates the scavenging of the cylinder but in addition insures the development of a higher pressure in the working cylinder than would be the case ordinarily.

The diagram shown in Fig. 8 is illustrative of the ideal or theoretical curves which may be obtained by a two cycle engine operating in accordance with two modifications of this invention. As shown in Fig. 8, 1 pound of air at a pressure of 14.7 pounds and at a volume of 4.5 cubic feet, after being compressed in an isothermal compressor to 114.7 pounds absolute was injected into the cylinder when the volume thereof was approximately 0.6 cubic foot. The injection of fuel began at about 200 pounds absolute when the volume of the cylinder was about 0.4 cubic foot. Adiabatic conditions existed until ignition at 300 pounds absolute. Injection of fuel was continued as represented by the line of constant pressure at 700 pounds until the volume was 0.6, whereupon expansion of adiabatic type was permitted to take place with an exhaust at 3.5 cubic feet and a pressure of 57.5 pounds absolute.

It is to be remembered that Fig. 8 represents an idealized cycle and therefore makes use only of pure isothermal, adiabatic, isometric and isobaric lines of compression and expansion or combustion. For this reason, sharp corners and more abrupt changes from one type of compression or expansion to another are represented. In actual operation, however, the only sharp corners or abrupt changes would be at intake and exhaust. The various polytropics would change gradually from one to another in rounded curves instead of abrupt corners. The polytropics would be neither pure isothermal, isometric nor isobaric but would be along lines lying between these pure polytropics.

Fig. 8 represents a constant volume-constant pressure type of diagram and this method of operation is best adapted to the use of a volatile liquid fuel having a low ignition temperature.

It is to be understood that means for compressing and cooling air need be provided. As shown in Fig. 9, air may be picked up through an inlet 10 into a compression cylinder 11 and then discharged into a suitable cooler 12 from whence the partly compressed and then cooled air is supplied to the compression cylinder 13 by a line 14. This cylinder then discharges into cooler 15 and the air at higher pressure is then sent to the compressor 16 from whence it is discharged into cooler 17 and then supplied by line 18 to the inlet port and valve 3 of the working cylinder 1. The pistons in the compression cylinders 11, 13 and 16 may be carried by a single crank shaft which is then driven either by a separate or auxiliary driving means, or from the main crank shaft of the piston 2 in the working cylinder and suitable gearing.

Numerous changes and modifications may be made both in the sequence and manner of operation and in the form of apparatus used. All such changes and modifications as come within the scope of the appended claims are embraced thereby.

I claim:

1. A method of operating an internal combustion engine provided with a mixing zone in communication with a combustion and expansion zone, comprising the steps of: compressing air exteriorly of the combustion and expansion zone along substantially isothermal lines by a plurality of alternate compression and cooling steps; injecting such air into the combustion and expansion zone and compressing said air in said zone; injecting fuel into the mixing zone; injecting an oxygen-containing gas at a superatmospheric pressure in excess of the pressure existing in the combustion and expansion zone and at a temperature sufficient to cause fuel to ignite in said mixing zone to initiate ignition of the fuel therein, the ignited fuel being introduced into the expansion zone to cause combustion and expansion to take place therein; and scavenging the combustion and expansion zone during the first part of the compression stroke by injecting compressed air into said combustion and expansion zone before compressing said air therein in cyclic operation of the method.

2. A method of operating an internal combustion engine provided with a mixing zone in communication with a combustion and expansion zone, comprising the steps of: compressing air exteriorly of the combustion and expansion zone along substantially isothermal lines by a plurality of alternate compression and cooling steps; injecting such air into the combustion and expansion zone and compressing said air in said zone; injecting fuel into a mixing zone; injecting an oxygen-containing gas at a superatmospheric pressure in excess of the pressure existing in the combustion and expansion zone and at a temperature sufficient to cause fuel to ignite in said mixing zone to initiate ignition of the fuel therein, the ignited fuel being introduced into the expansion zone to cause combustion and expansion to take place therein; and exhausting the combustion and expansion zone during the first part of the compression stroke.

CABELL CARRINGTON.